R. R. AMOS.
SHAFT BEARING.
APPLICATION FILED OCT. 16, 1908.
936,286.
Patented Oct. 12, 1909.
2 SHEETS—SHEET 1.
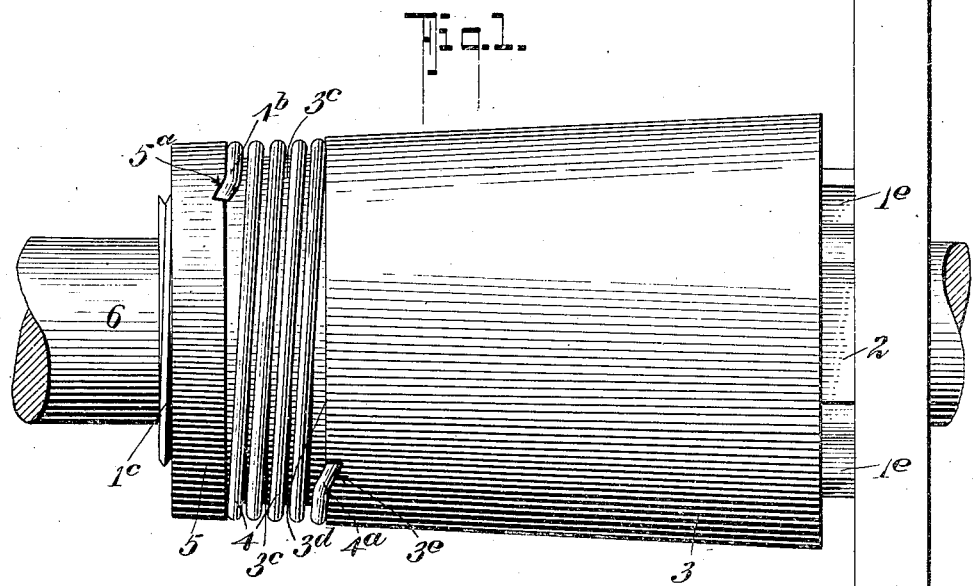
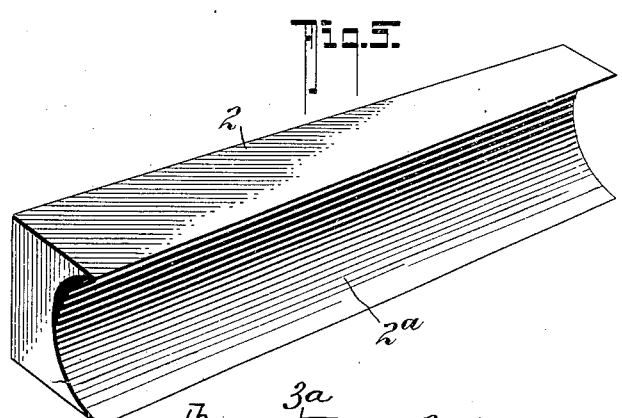
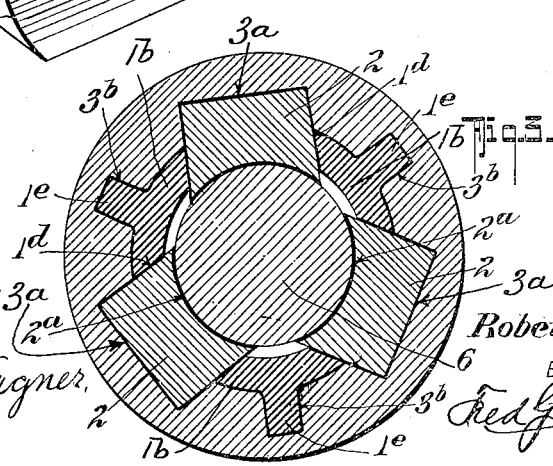
WITNESSES:
H. Woodard
Charles H. Wagner
INVENTOR
Robert R. Amos
BY
Fred J. Dieterich
ATTORNEYS

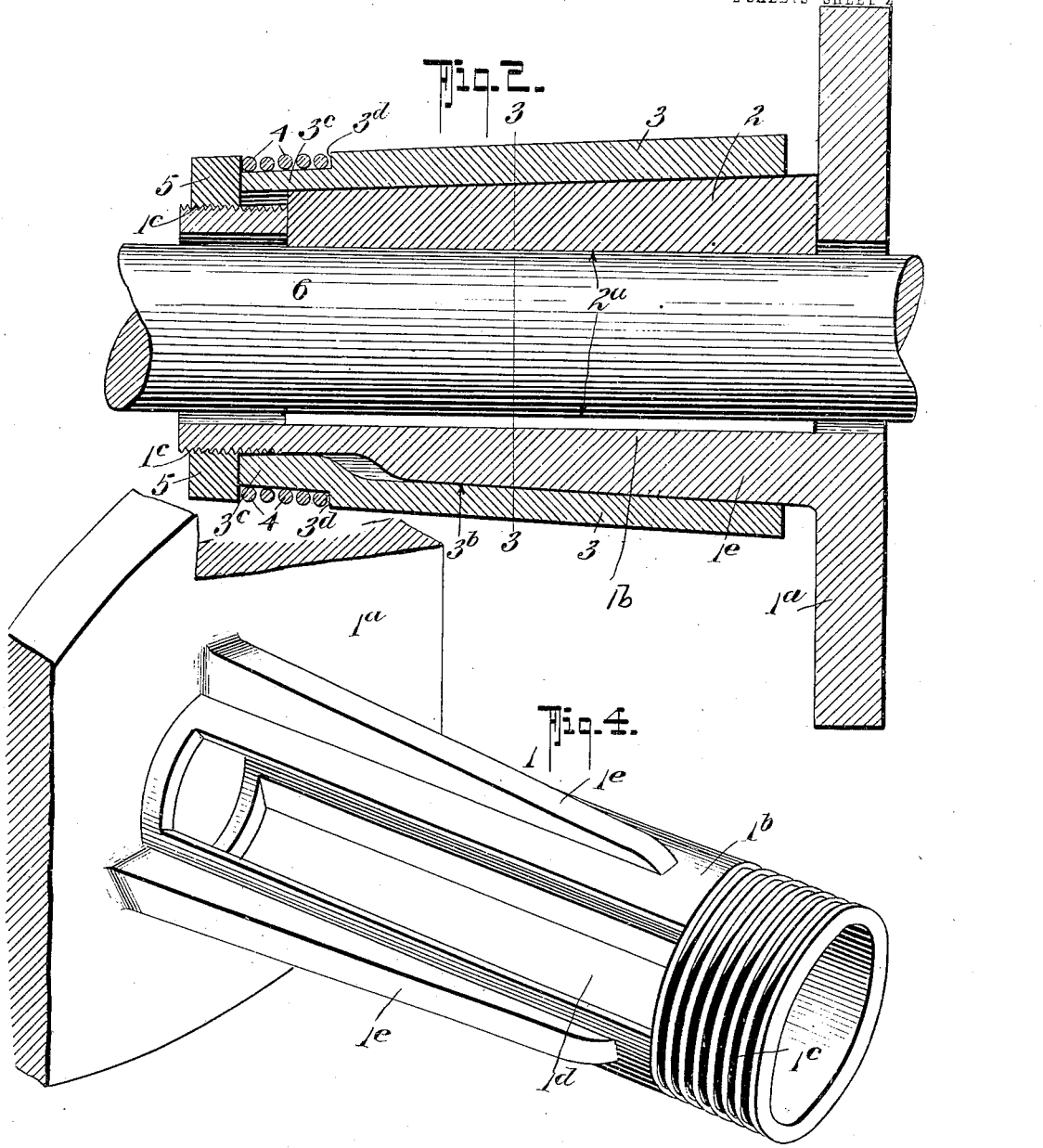

UNITED STATES PATENT OFFICE.

ROBERT RAYMOND AMOS, OF PORTLAND, OREGON.

SHAFT-BEARING.

936,286.  Specification of Letters Patent.  Patented Oct. 12, 1909.

Application filed October 16, 1908. Serial No. 458,094.

*To all whom it may concern:*

Be it known that I, ROBERT RAYMOND AMOS, residing at Portland, in the county of Multnomah and State of Oregon, have invented certain new and useful Improvements in Shaft-Bearings, of which the following is a specification.

My invention relates to an improved shaft bearing for the propeller shafts of marine vessels and the like and for use in connection with ordinary shafting.

Primarily my invention has for its object to provide a bearing, as particularly adapted for use in connection with the propeller shafts of marine vessels, such as motor boats and the like in which means are provided to take up wear and maintain a proper bearing for the shaft at all times.

Generically my invention embodies a skeleton frame or shaft boxing having a series of longitudinal slots or pockets merging with the shaft bore of the frame and a series of radially arranged longitudinal ribs alternating with the slots. In the pockets bearing blocks of suitable material are placed and one end of the skeleton frame is formed with or secured to a face plate or support for the bearing, while the other end of the frame terminates in a threaded portion.

Over the skeleton frame a sleeve is placed, the sleeve having slots to receive the bearing blocks and having other slots to receive the radial ribs. The sleeve slots and the ribs and the bearing blocks have a wedge-like engagement with one another whereby when the sleeve is moved in one direction along the skeleton frame the bearing blocks will tend to tighten their grip on the shaft and thereby take up wear.

In order to continuously tend to move the sleeve in one direction to cause the bearing blocks to grip the shaft, a coil spring is provided on the sleeve which abuts a nut on the threaded end of the skeleton frame and forces the sleeve in a direction away from such nut. The sleeve and nut are provided with recesses to receive the ends of the spring, thus causing the spring to act, as it were, as a nut lock in addition to its usual function. The radial ribs prevent rotation of the sleeve and spring.

More specifically my invention embodies those novel details of construction, combination and arrangement of parts all of which will be first described in detail, and then be specifically pointed out in the appended claims, reference being had to the accompanying drawings, in which:—

Figure 1, is a side elevation of a propeller shaft and my invention. Fig. 2, is a central vertical longitudinal section thereof. Fig. 3, is a cross section on the line 3—3 of Fig. 2. Fig. 4, is a perspective view of the skeleton frame. Fig. 5, is a similar view of a bearing block.

Referring now to the accompanying drawings, in which like letters and numerals of reference indicate like parts in all of the figures, 1 designates the skeleton frame or shaft boxing which is secured to or formed with the base plate $1^a$ by means of which the bearing may be secured to the pipe log of a motor boat, when used on such, or by means of which the bearing may be secured in a fixed position.

$1^b$ designates the tubular frame which has the end opposite the plate $1^a$ threaded as at $1^c$ and which is provided with alternately arranged pockets $1^d$ and ribs $1^e$, as shown.

The ribs $1^e$ taper from the end next to the plate $1^a$ toward the ends of the frame and toward the threaded end thereof.

2 represents the bearing blocks which are formed of lignum vitæ or any other suitable material and which have a shaft bearing surface $2^a$ and fit the pockets $1^d$ of the frame. The bearing blocks are of wedge shape in longitudinal section tapering with their larger end next to the plate $1^a$ and their smaller end next to the threaded end of the skeleton frame.

A sleeve 3 is held over the frame 1 and over the blocks 2, the sleeve having tapering grooves $3^a$ for the reception of the blocks 2 and other tapering grooves $3^b$ to receive the ribs $1^e$.

The sleeve 3 at its smaller end is provided with a reduced portion $3^c$ to form a shoulder $3^d$ that is provided with a notch $3^e$. A coil spring 4 is held on the portion $3^c$ with its bent end $4^a$ to engage the notch $3^e$ while the other end $4^b$ of the spring 4 engages a notch $5^a$ in the nut 5 that is screwed on the threaded end of the skeleton frame 1. Thus the spring 4 normally tends to force the sleeve 3 away from the nut 5 to cause the bearing blocks 2 to engage the shaft 6 and hold it in proper alinement. As the blocks wear down the spring 4 will force the sleeve 3 along, thus causing the sleeve to press the bearing blocks against the shaft and maintain its alinement and take up wear.

After the blocks 2 have worn to such an extent that the tension of the spring 4 becomes too weak to perform its function, it necessary to tighten the nut 5 to again put the spring 4 under proper tension.

From the foregoing description taken in connection with the accompanying drawings, it is thought the complete construction, operation and numerous advantages of my invention will be readily understood by those skilled in the art to which the invention appertains.

What I claim is:

1. A shaft bearing comprising a skeleton frame through which the shaft passes, said frame having alternately arranged pockets and ribs, bearing blocks held in said pockets, and a sleeve held over said frame and blocks and engaged by such ribs to hold the blocks in position.

2. A shaft bearing comprising a skeleton frame through which the shaft passes, said frame having alternately arranged pockets and ribs, bearing blocks held in said pockets, a sleeve held over said frame and blocks and engaged by said ribs to hold the blocks in position, and means continuously tending to move said sleeve in one direction, said sleeve and said blocks having means when the sleeve is moved in such direction to force the blocks toward the axial line of the frame.

3. A shaft bearing comprising a skeleton frame and a support therefor, said skeleton frame having alternately arranged ribs and pockets, bearing blocks held in said pockets, a sleeve around said frame and bearing blocks, said sleeve being grooved to receive said bearing blocks and ribs said sleeve having means when moved in one direction for forcing said bearing blocks toward the axial line of the frame, means normally tending to force said sleeve in one direction, said last named means comprising a spring carried by the sleeve, and engaging a part of the skeleton frame.

4. A shaft bearing comprising a skeleton frame through which the shaft is adapted to project, said frame having pockets, bearing blocks held in said pockets, a sleeve held over said frame and said bearing blocks, said sleeve and said bearing blocks having a wedge-like engagement with one another in virtue of which when the sleeve is moved in one direction the bearing blocks will be forced toward the axial line of the frame, means continuously tending to force said sleeve in one direction, and means for preventing rotation of the sleeve on the frame, said last named means comprising ribs on the frame which enter grooves in the sleeve.

5. A shaft bearing comprising a skeleton frame through which the shaft projects, said frame having pockets, bearing blocks held in said pockets, a sleeve around said frame and said bearing blocks, said sleeve having grooves to receive said bearing blocks, and said sleeve and said bearing blocks having means in virtue of which when the sleeve is moved in one direction the bearing blocks will be forced toward the axial line of the frame.

6. A shaft bearing comprising a skeleton frame through which the shaft projects, said frame having pockets, bearing blocks held in said pockets, a sleeve around said frame and said bearing blocks, said sleeve having grooves to receive said bearing blocks, said sleeve and said bearing blocks having means in virtue of which when the sleeve is moved in one direction the bearing blocks will be forced toward the axial line of the frame, and means independent of the bearing blocks for preventing rotation of the sleeve on the frame.

7. A shaft bearing comprising a skeleton frame through which the shaft projects, said frame having pockets, bearing blocks held in said pockets, a sleeve around said frame and said bearing blocks, said sleeve having grooves to receive said bearing blocks, and said sleeve and said bearing blocks having means in virtue of which when the sleeve is moved in one direction the bearing blocks will be forced toward the axial line of the frame, said sleeve having a reduced end and provided with a shoulder, a coil spring mounted thereon to engage said shoulder, and a nut threaded on said frame to engage said coil spring.

8. A shaft bearing comprising a skeleton frame through which the shaft projects, said frame having pockets, bearing blocks held in said pockets, a sleeve around said frame and said bearing blocks, said sleeve having grooves to receive said bearing blocks, and said sleeve and said bearing blocks having means in virtue of which when the sleeve is moved in one direction the bearing blocks will be forced toward the axial line of the frame, means independent of the bearing blocks for preventing rotation of the sleeve on the frame, said sleeve having a reduced end and provided with a shoulder, a coil spring mounted thereon to engage said shoulder, and a nut threaded on said frame to engage said coil spring.

9. A shaft bearing comprising a skeleton frame through which the shaft projects, said frame having pockets, bearing blocks held in said pockets, a sleeve around said frame and said bearing blocks, said sleeve having grooves to receive said bearing blocks, and said sleeve and said bearing blocks having means in virtue of which when the sleeve is moved in one direction the bearing blocks will be forced toward the axial line of the frame, said sleeve having a reduced end and provided with a shoulder, a coil spring mounted thereon to engage said shoulder, a nut threaded on said frame to engage said coil spring, and said sleeve and said nut having means to receive the ends of said coil spring to cause it to act as a nut lock.

10. A shaft bearing comprising a skeleton frame through which the shaft projects, said frame having pockets, bearing blocks held in said pockets, a sleeve around said frame and said bearing blocks, said sleeve having grooves to receive said bearing blocks, said sleeve and said bearing blocks having means in virtue of which when the sleeve is moved in one direction the bearing blocks will be forced toward the axial line of the frame, means independent of the bearing blocks for preventing rotation of the sleeve on the frame, said sleeve having a reduced end and provided with a shoulder, a coil spring mounted thereon to engage said shoulder, a nut threaded on said frame to engage said coil spring, and said sleeve and said nut having means to receive the ends of said coil spring to cause it to act as a nut lock.

ROBERT RAYMOND AMOS.

Witnesses:
B. E. CAMPBELL,
JOHN I. O'PHELAN.